United States Patent [19]
Cepynsky et al.

[11] Patent Number: 6,011,997
[45] Date of Patent: Jan. 4, 2000

[54] TIME-DIVISION MULTIPLEX CONTROL UNIT I/O UNIT AND PROGRAMMING SYSTEM

[75] Inventors: George L. Cepynsky, Lisle; Martin J. Durbin, Oak Forest, both of Ill.

[73] Assignee: Technical Products Group, Inc., Lombard, Ill.

[21] Appl. No.: 08/943,832

[22] Filed: Oct. 3, 1997

[51] Int. Cl.[7] ....................................................... G06F 3/00
[52] U.S. Cl. ............................................. 700/83; 345/326
[58] Field of Search .................................... 345/326, 329, 345/334, 78, 524; 370/537; 700/83, 84

[56] References Cited

U.S. PATENT DOCUMENTS

| | | | |
|---|---|---|---|
| 3,529,292 | 9/1970 | Neill et al. | 706/46 |
| 3,842,249 | 10/1974 | Geyer et al. | 364/528.3 |
| 3,961,139 | 6/1976 | Bowman et al. | 370/443 |
| 4,507,778 | 3/1985 | Tan | 370/443 |
| 4,907,222 | 3/1990 | Slavik | 370/443 |
| 5,353,285 | 10/1994 | Van Der Plas et al. | 370/443 |
| 5,630,025 | 5/1997 | Dolby et al. | 706/46 |

*Primary Examiner*—John E. Breene
*Assistant Examiner*—Tadesse Hailu
*Attorney, Agent, or Firm*—Brinks Hofer Gilson & Lione

[57] ABSTRACT

A time-division multiplexing system includes a control unit and multiple I/O units. The control unit generates timing signals that select one of the I/O units to be enabled at any time, and the timing signals include clock signals that index selected channels within the enabled I/O unit. The control unit stores both Boolean logical relationships among the channels of the multiplex system and functional names for the channels of the multiplex system in a reprogrammable memory. The control unit can be programmed with a programming system that uses a graphical user interface to make the programming operation simple and reliable.

13 Claims, 6 Drawing Sheets

Microfiche Appendix Included
(5 Microfiche, 351 Pages)

PROGRAMMING SYSTEM 44
- CONTROL UNIT READ SYSTEM
- CONTROL UNIT PROGRAMMING SYSTEM
- LABEL EDITOR
- BOOLEAN EDITOR
    GUI DISPLAY SYSTEM
        BOOLEAN RELATIONSHIP SELECTION SYSTEM
        CHANNEL LIST DISPLAY SYSTEM
        CHANNEL SELECTION SYSTEM
        NOT SELECTION SYSTEM

TIME-DIVISION MULTIPLEX CONTROL UNIT I/O UNIT AND PROGRAMMING SYSTEM

REFERENCE TO MICROFICHE APPENDIX

This application includes a microfiche appendix (five fiche, 351 frames) made up of Appendix A (pp. 1–264), Appendix B (pp. 1–76), and Appendix C (Drawings C1–C3). This Appendix contains material which is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

BACKGROUND OF THE INVENTION

This invention relates to time-division multiplexing systems, of the type which may, for example, be used to control loads on a vehicle such as a truck, bus, or automobile.

U.S. Pat. No. 4,907,222, assigned to the assignee of the present invention, describes a commercially successful time-division multiplexing system. This system has been used in many commercial applications, and it provides a simple, two-line bus having ten separate channels. Data, which can either be input data or output data, is applied to the data portions of the ten channels. In this way, inputs can be efficiently linked with outputs, while minimizing cabling requirements.

The present invention is directed to components for a time-division multiplexing system that provide further operational advantages.

SUMMARY OF THE INVENTION

This invention is defined by the following claims, and nothing in this section should be taken as a limitation on those claims.

By way of introduction, it can be stated here that the time-division multiplexing system described below provides three important advantages over the prior-art system of U.S. Pat. No. 4,907,222. First, the system described below uses a timing system that includes clock signals, as well as first and second synchronization signals. The first synchronization signals divide the clock signals into sets, and one clock signal within each set is associated with each respective channel on the respective I/O unit. The first synchronization signals are grouped in sets, and within each set each of the first synchronization signals corresponds to and indicates a respective one of the I/O units. The second synchronization signals mark the boundaries between adjacent sets of the first synchronization signals, and are used to insure that all of the I/O units are reset properly at the end of a complete set of the first synchronization signals. This arrangement allows a large number of I/O units to be included in the multiplexing system simply and efficiently.

Another improvement of the multiplexing system described below relates to the manner in which the system is programmed. The programming system described below utilizes a graphical user interface that graphically displays both the Boolean relationships between selected multiplex channels, as well as functional names of the multiplex channels. This graphical user interface allows the user to select the desired Boolean relationships and to alter the functional names as appropriate. Once the Boolean relationships and the functional names have been selected, the programming system stores both types of information in the memory of the control unit of the multiplexing system. This approach provides great flexibility and ease of programming. Users without special training in computer programming can readily select the desired Boolean relationships and store them in the control unit.

A third improvement of the system described below relates to the manner in which the control unit of the multiplexing system includes a programmable memory that stores both the functional names of at least some of the multiplex channels and the Boolean relationships among selected ones of the multiplex channels. By storing the functional names in the memory of the control unit, reprogramming of the control unit is facilitated, and the need to retain additional documentation is reduced or eliminated.

The invention itself will best be understood by reference to the following detailed description, taken in conjunction with the accompanying drawings.

DETAILED DESCRIPTION OF THE PRESENTLY PREFERRED EMBODIMENT

Figure 1:
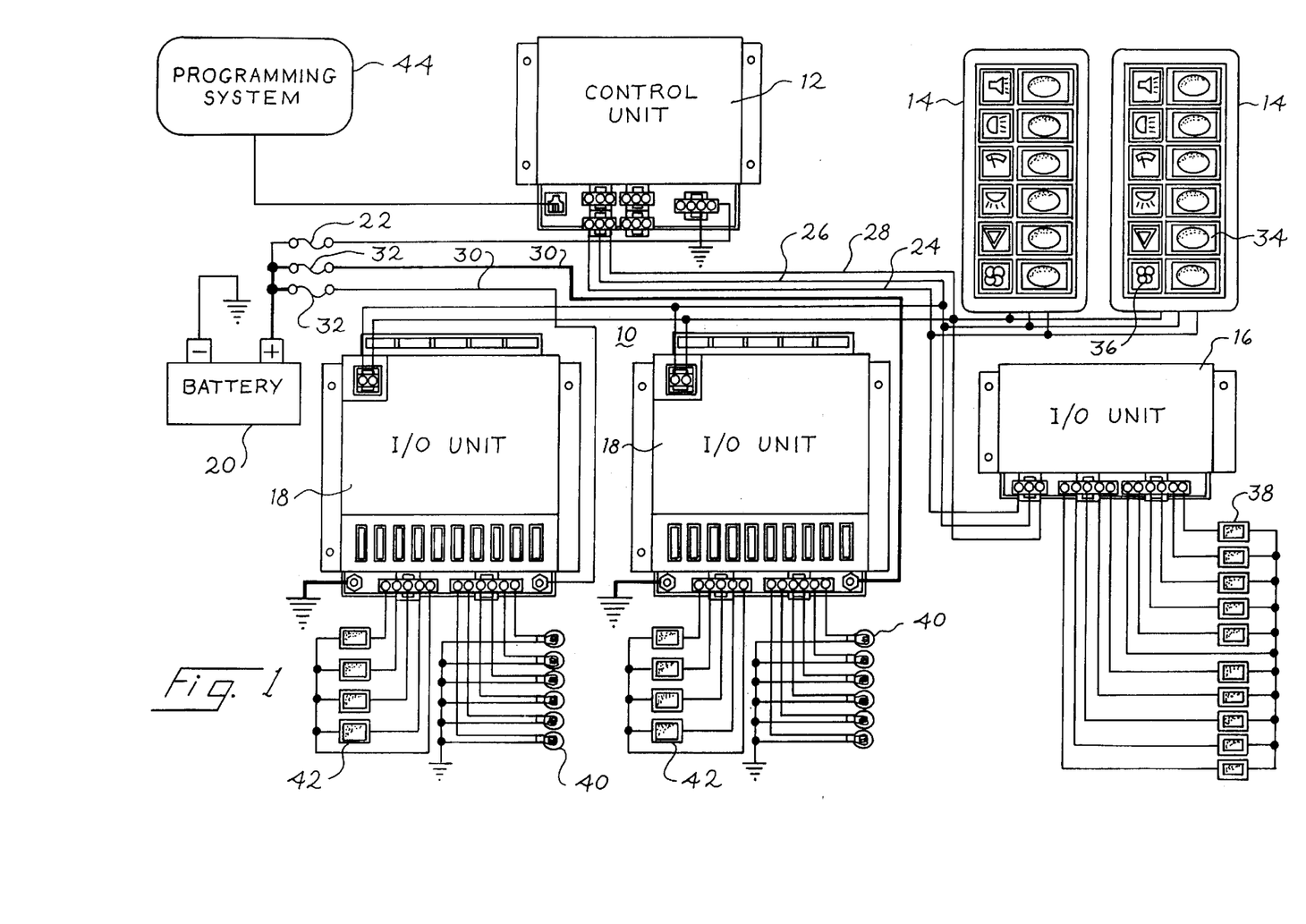
FIG. 1 is a block diagram of a time-division multiplexing system that incorporates a preferred embodiment of this invention.

Turning now to the drawings, FIG. 1 is a block diagram of a time-division multiplexing system 10 that includes a control unit 12 and three types of I/O units 14, 16, 18. The control unit 12 is connected to a battery 20 via a fuse 22, and the control unit 12 is connected to the I/O units 14, 16 by a power conductor 24, a signal conductor 26 and a ground conductor 28. The I/O units 18 are connected directly to the battery 12 via power conductors 30 and fuses 32. Electronic circuits of the I/O units 14, 16, 18 are powered by voltages associated with timing signals on the signal conductor 26, as described below. Loads connected to the I/O units 14, 16, 18 are powered by the power conductors 24, 30.

Three different types of I/O units 14, 16, 18 are shown to illustrate a few of the many forms the I/O units can take. Each I/O unit 14 includes a selected number of input push buttons 34, each associated with a respective indicator lamp 36. Thus, each I/O unit 14 includes six input channels, each associated with a respective one of the push buttons 34. Of course, a greater or smaller number of push buttons can be used in other embodiments.

The I/O unit 16 includes input channels that are connected to respective switches 38. The I/O unit 16 functions to provide input signals to the signal conductor or bus 26, but in this case the switches 38 are mounted externally of the I/O unit 16, and the I/O unit 16 includes ten input channels.

Each I/O unit 18 provides a combination of output channels and input channels. In the example of FIG. 1, each I/O unit 18 includes six output channels, and each of the output channels is connected to a respective load 40. The loads 40 can take any suitable form, such as lights, motors, relays, or the like. The output channels can either source or sink power to the respective loads 40. In this embodiment four input channels are provided, and each of the input channels is connected to a respective switch 42. The switches 42 control the signal placed on the input channels. Of course, the number of output channels and the number of input channels can be varied as appropriate. Although not shown, an I/O unit can also be formed which consists exclusively of output channels without any input channels.

As shown in FIG. 1, the control unit 12 is programmed by a programming system 44. The programming system 44 is typically connected to the control unit 12 only temporarily, during initial setup of the control unit 12. The control unit 12 is disconnected from the programming system 44 for autonomous operation between programming sessions.

Figure 2:
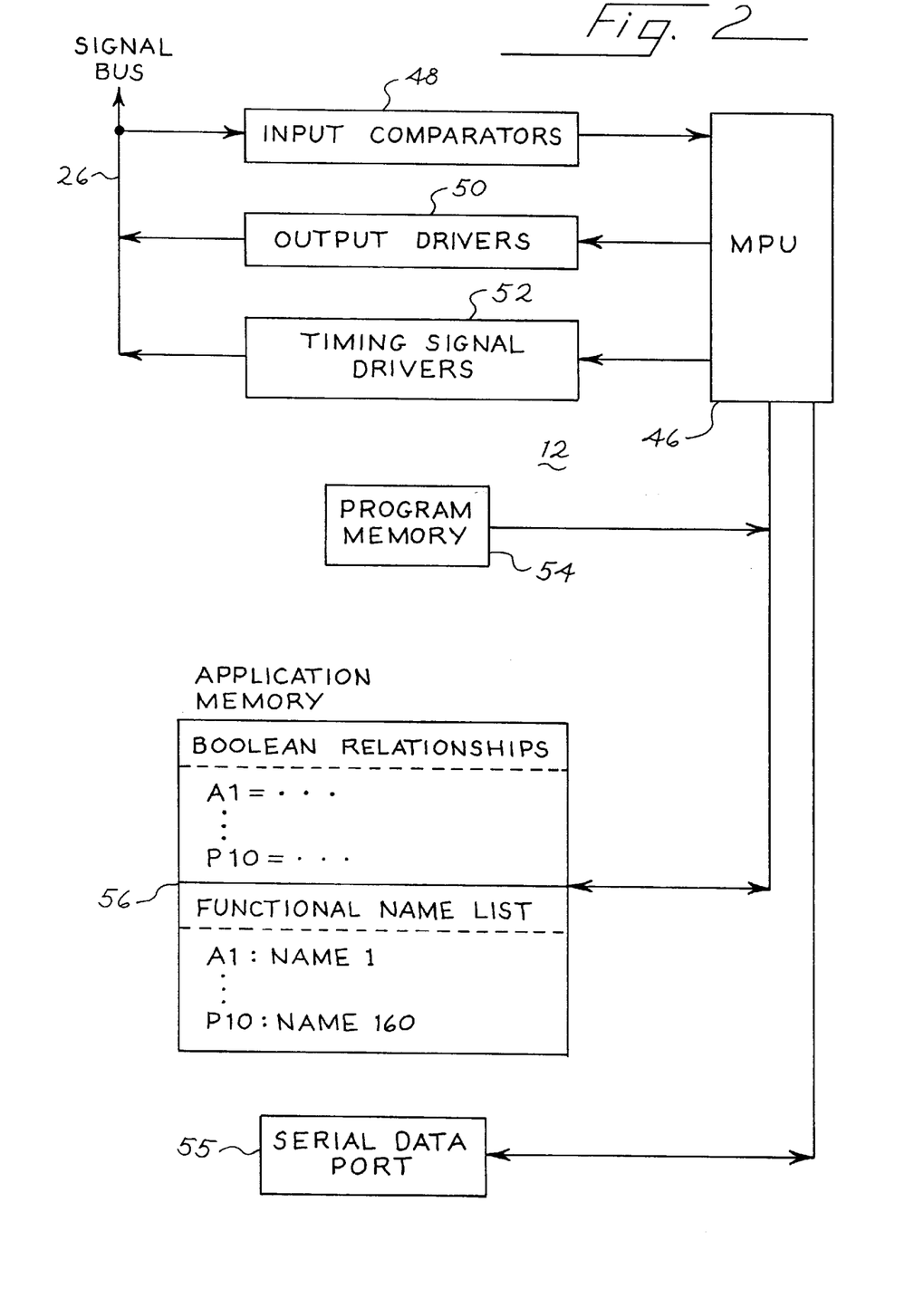
FIG. 2 is a block diagram of the control unit of FIG. 1.

FIG. 2 provides a block diagram of the control unit 12. As shown in FIG. 2, the control unit 12 includes a microprocessor 46 that is connected to the signal conductor or bus 26 via input comparators 48, output drivers 50, and timing signal drivers 52. The microprocessor 46 is coupled to a serial I/O port 55 that is used to connect the control unit 12 to the programming system 44 as described below. The microprocessor 46 is also coupled to a program memory 54 and to an application memory 56. The program memory 54 stores the operating system for the microprocessor 46, and the application memory 56 includes two sections. The first section stores the Boolean relationships that are used by the microprocessor 46 to control the output drivers 50. The application memory 56 also includes a second section that stores a list of functional names for the respective channels of the multiplex system. In this example there are up to 16 I/O units, each having up to ten channels. Thus, a total of 160 channels A1–A10, B1–B10 . . . P1–P10 are included, each associated with a respective functional name. Each functional name typically describes the function of the respective channel for the particular application. For example, in an automotive application channel A1 may have the functional name "Master Light Switch".

Figures 3, 6, 7:
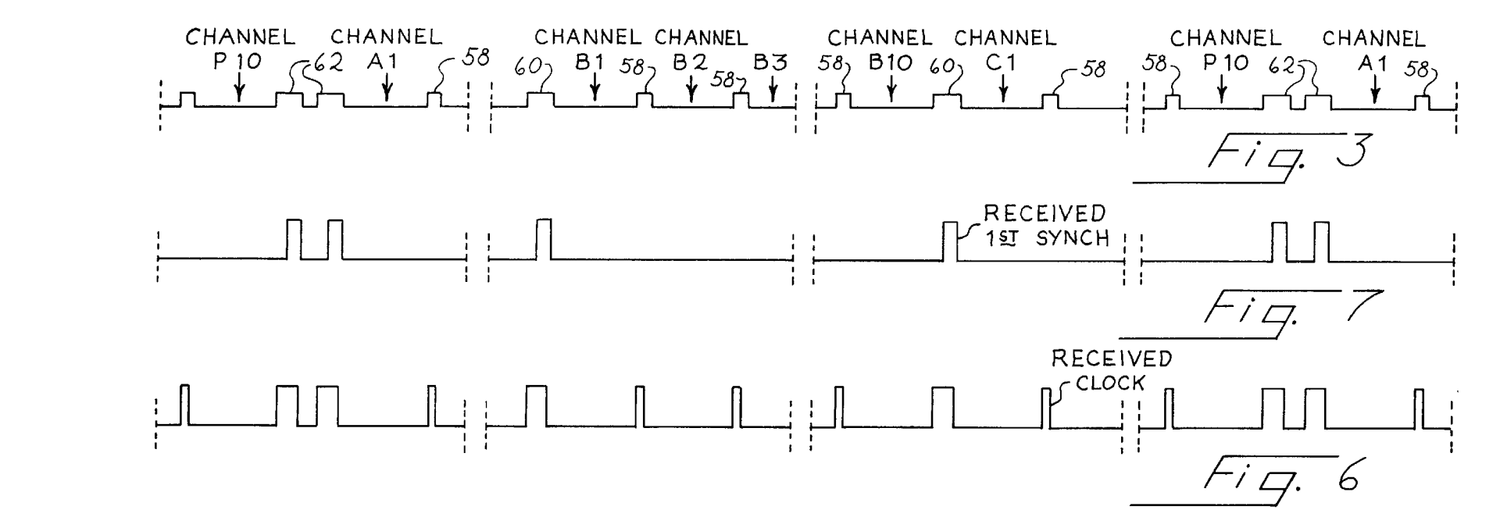
FIGS. 3–4 are timing diagrams illustrating operation of the control unit of FIG. 2.
FIGS. 6–8 are timing diagrams illustrating operation of the I/O unit of FIG. 5.

The microprocessor 46 controls the timing signal drivers 52 to generate three types of timing signals, as shown in FIG. 3: clock pulses 58, first synchronization signals 60, and second synchronization signals 62. In FIG. 3, the first synchronization signals 60 have a pulse duration greater than that of the clock pulses 56, and the second synchronization signals are double pulses. Of course, these relationships are not critical, and they can be changed as appropriate for the particular application.

The clock pulses 58 are arranged in sets, and each set of clock pulses 58 is associated with a separate respective I/O device. Adjacent sets of clock pulses 58 are separated by first synchronization signals 60. Thus, the first synchronization signals 60 mark the boundaries of the sets of clock pulses 58. Each first synchronization signal 60 is associated with a separate, respective one of the I/O units, and a complete set of first synchronization signals includes 15 separate first synchronization signals. The boundaries between adjacent sets of first synchronization signals are marked by the second synchronization signals 62.

As shown in FIG. 3, the clock pulses 58 immediately following a second synchronization signal 62 are associated with a first I/O unit A, and the clock pulses 58 demarcate channels A1, A2 . . . A10 associated with this first I/O unit. The next signal is a first synchronization signal 60 that indicates that the next set of clock pulses 58 is associated with the next I/O unit, unit B in this example. The clock pulses 58 of the second set demarcate the 10 channels B1, B2 . . . B10 associated with the second I/O unit. This pattern of sets of clock pulses 58 separated by first synchronization signals 60 repeats until all 16 I/O units have been addressed. The last set of clock pulses 58 corresponds to the 10 channels P1, P2 . . . P10. Channel P10 is immediately followed by another second synchronization signal 62 that causes the cycle to repeat.

Figures 4, 8:
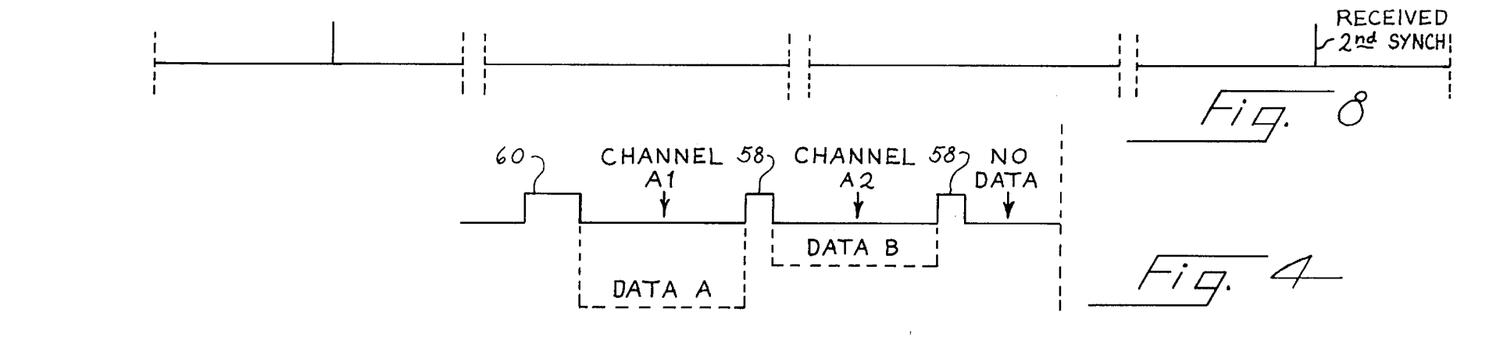

FIG. 4 provides further information in the manner in which information is exchanged on the signal conductor or bus 26. Following a first synchronization signal 60, individual channels are defined by individual clock pulses 58. Each channel represents a period of time in which the voltage on the data bus 26 can be at the Data A level, the Data B level, or the No Data level, as shown in FIG. 4. The control unit 12 and the I/O units 14, 16, 18 each include drivers for placing a voltage on the signal bus at the appropriate time in one of these three data levels, and for reading the voltage on the bus. If desired, more than three data levels or analog (continuously variable) voltage levels can be used.

Figure 5:
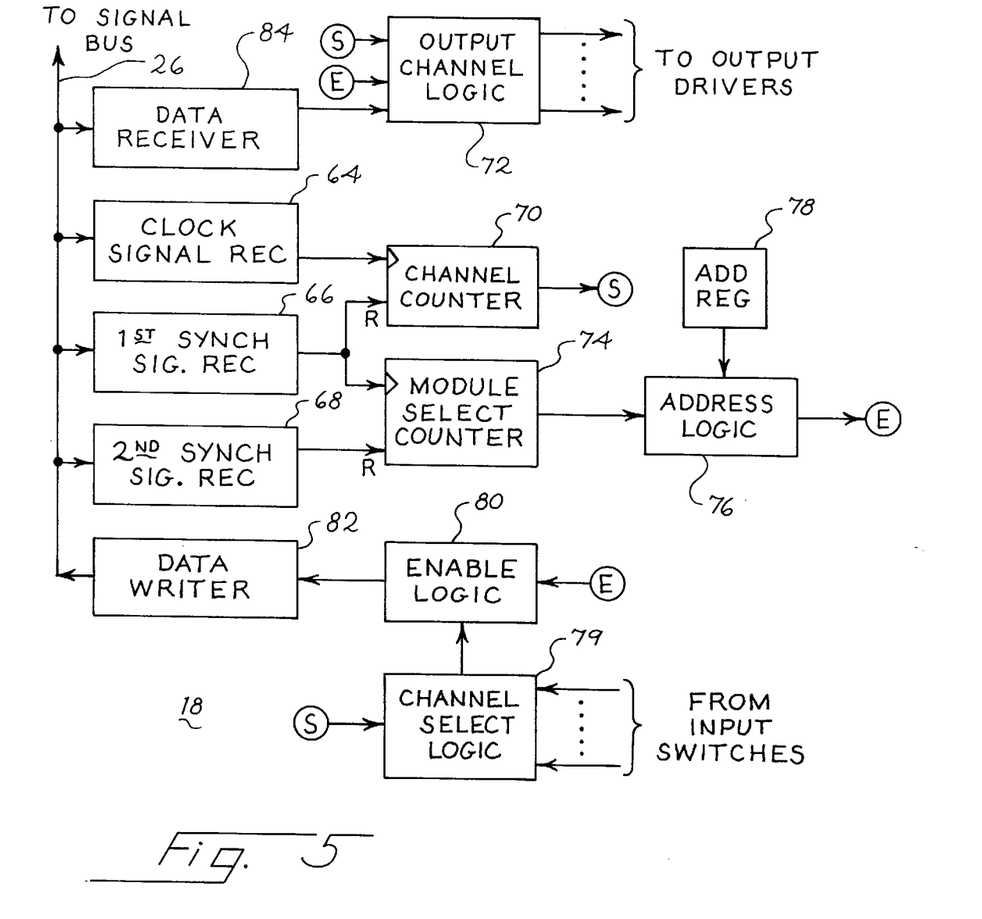
FIG. 5 is a block diagram of one of the I/O units of FIG. 1.

FIG. 5 provides a block diagram of one of the I/O units 18. As shown in FIG. 5, the I/O unit 18 includes a clock signal receiver 64, a first synchronization signal receiver 66, and a second synchronization signal receiver 68. The receivers 64, 66, 68 are sensitive to the respective signals, and produce received signals or outputs as shown in FIGS. 6–8, respectively. As discussed above, clock signals identify individual multiplex channels, first synchronization signals identify individual I/O units, and second synchronization signals identify the start of a complete cycle of addresses of I/O units A–P.

The received clock signals generated by the receiver 64 are applied to the clock input of a channel counter 70. The received first synchronization signals generated by the receiver 66 are applied to the reset input of the channel counter 70 and to the clock input of a module select counter 74. Received second synchronization signals generated by the receiver 68 are applied to a reset input of the module select counter 74.

The output of the module select counter 74 increments from one to 16, before being reset to one by a received second synchronization signal applied to the reset input of the counter 74. The output of the module select counter 74 is applied to address logic 76 that is also connected to an address register 78. The address register 78 stores the address of the respective I/O unit 18, and can take any suitable form, including software registers, jumper cable registers, or the like. The address register 78 stores a number between one and 16 as appropriate for the respective I/O unit 18. The address logic 76 compares the inputs received from the module select counter 74 and the address register 78 and produces a module enable signal E for the appropriate set of clock pulses. For example, if the address register 78 is set at B or 01 Hex, the address logic 76 will provide the enable signal E only for the second set of clock pulses after each received second synchronization signal is received.

The channel counter 70 is reset by each received first synchronization signal and counts individual received clock signals. The output S of the channel counter 70 is a count indicative of the channel number that is currently active on the signal bus 26.

Input switches apply input signals to channel select logic 79 that also receives the count S from the counter 70. The input signal from the input switch associated with the currently active channel, as indicated by the signal S, is passed by the channel select logic 79 to enable logic 80. Enable logic 80 receives the enable signal E and, when the respective I/O unit is enabled, passes the output signal from the channel select logic 79 to a data writer 82. The data writer 82 then applies the appropriate voltage (Data A, Data B, or No Data) to the appropriate channel on the signal bus 26, as indicated in FIG. 4.

With respect to outputs, the output channel logic 72 receives as inputs the enable signal E, the count S from the counter 70, and received data from the data receiver 84. When the respective I/O unit 18 is enabled, as indicated by the signal E, the output channel logic 72 applies data as read by the data receiver 84 to the respective output drivers on channels as indicated by the count S. In order to reduce output errors, output channels are not latched until it has been determined that exactly the expected total number of clock pulses were received in a given set of clock pulses.

Thus, the I/O unit 18 operates to place data on the signal bus 26 at respective data channels, as dictated by the states of the input switches, and to control the output drivers as a function of the data levels on the respective channels of the signal bus 26. As described above, each respective I/O unit 18 is enabled only for the set of clock pulses corresponding to the address stored in the address register 78.

The second synchronization signals ensure that all of the I/O units are properly synchronized. The first synchronization signals are counted to ensure that only the appropriate one of the I/O units is enabled at any given time. The clock signals are counted to sequence through the channels associated with each I/O unit.

Figure 9:
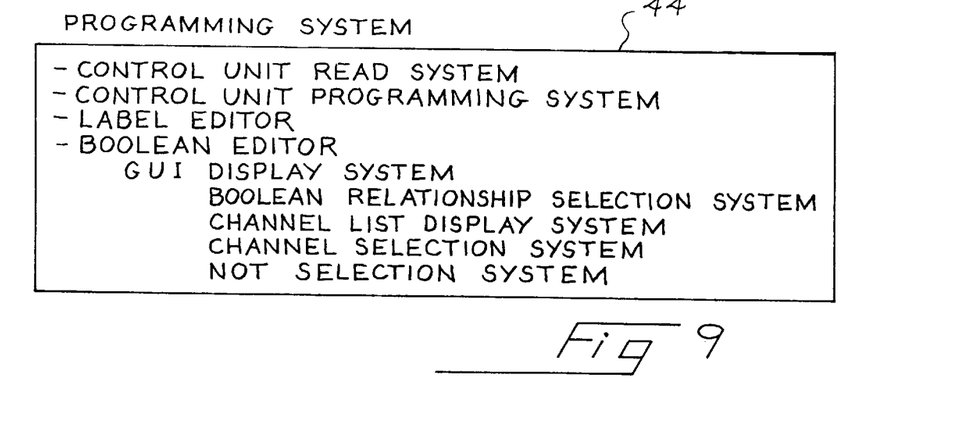
FIG. 9 is a block diagram of the programming system of FIG. 1.

FIG. 9 provides a block diagram of the programming system 44. In general, a conventional computer can be used to implement the programming system, such as a suitable personal computer. The programming system includes four modules that will be discussed here. The first of these modules is a control unit read system that allows the programming system 44 to read and store the contents of the application memory 56 of the control unit 12 (FIG. 2).

The second module is a control unit programming system that allows the programming system 44 to store Boolean relationships and a functional name list into the application memory 56.

The third module is a label editor that allows the user to provide or to revise functional names for selected multiplex channels. With the label editor a user can customize functional names to correspond to the actual functions associated with respective multiplex channels. This facilitates programming and understanding the operation of the control unit 12.

The fourth module is a Boolean editor that allows the user to define the Boolean relationships among the various channels of the multiplex system. As described below, the Boolean editor includes a graphical user interface display system that displays the Boolean relationships in graphical form and allows the user to select the desired Boolean relationships and to alter these relationships. This graphical user interface also includes a channel list display system that lists the various channels of the multiplex system and allows a user to scroll through the list and to select the desired channel when setting up desired Boolean relationships. The graphical user interface display system also includes a selection system that allows a user to select the Boolean not operation. The label editor and the Boolean editor will be described in greater detail below in conjunction with FIGS. 10–12.

Figure 10:
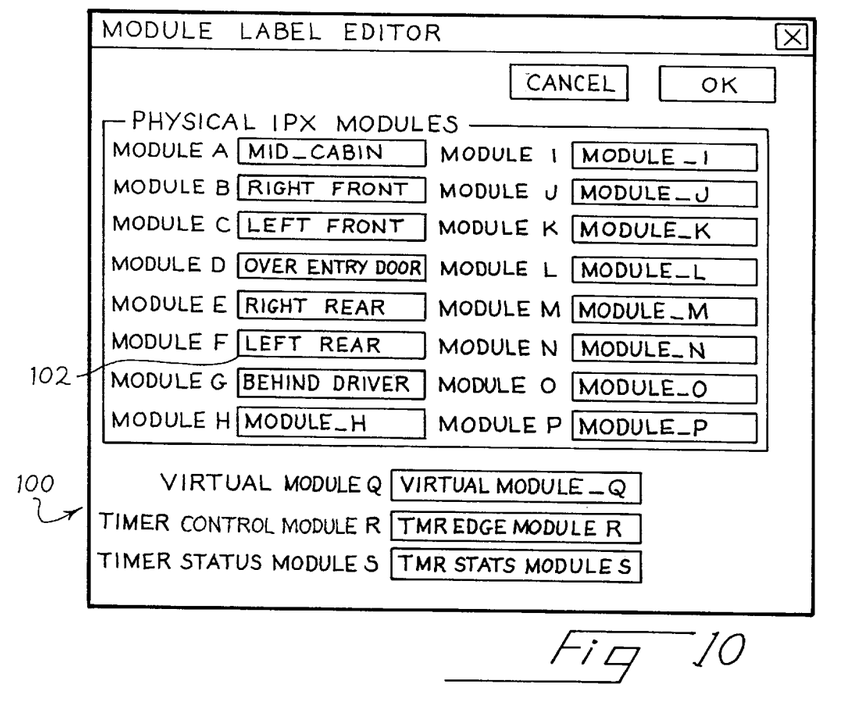
FIGS. 10 and 11 are illustrations of screens displayed by the Label editor of FIG. 9.

The label editor allows the user to name both the I/O units and the channels of the I/O units. FIG. 10 shows a screen 100 used by the label editor to allow the user to define the functional names of individual I/O units, simply by typing the desired names in the respective text entry regions 102.

Figure 11:
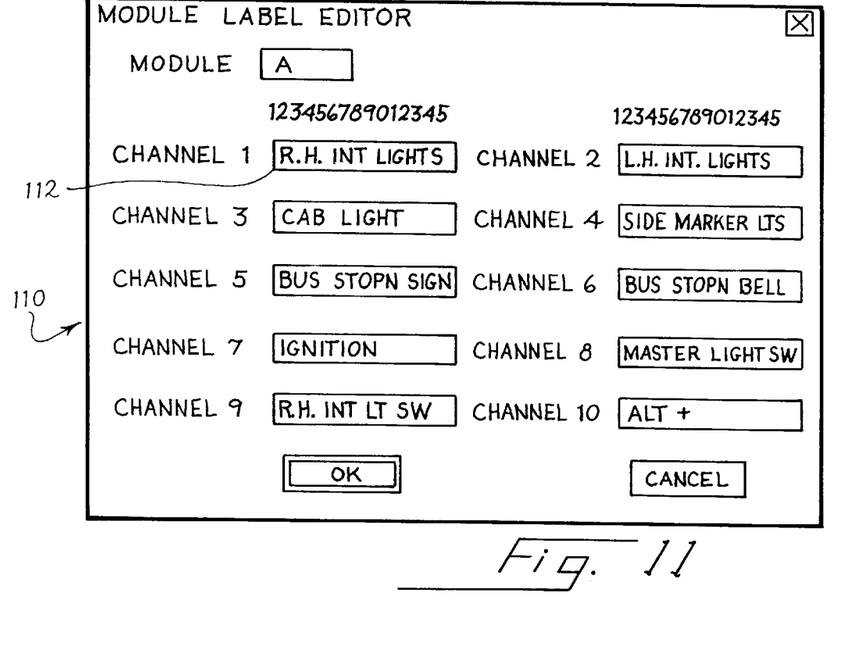

FIG. 11 shows a screen 110 used by the label editor to allow the user to define the functional names of individual channels. The user selects one of the modules or I/O units by entering a letter between A and P, either by typing the associated letter in a designated region or by selecting a module from a list with a scroll bar. Once the module or I/O unit has been selected, the label editor allows the user to select a channel, and then to type in a name for the selected channel of the selected I/O unit in a text entry region 112 of the screen 110. These names can be freely assigned by the user to communicate the function of the respective channels. Once the channels have been named as appropriate for a particular application, the need for separate documentation of the Boolean relationships programmed into the control unit is substantially reduced. The label editor stores the functional names once entered by the user for later storage in the control unit 12 via the control unit programming system.

Figure 12:
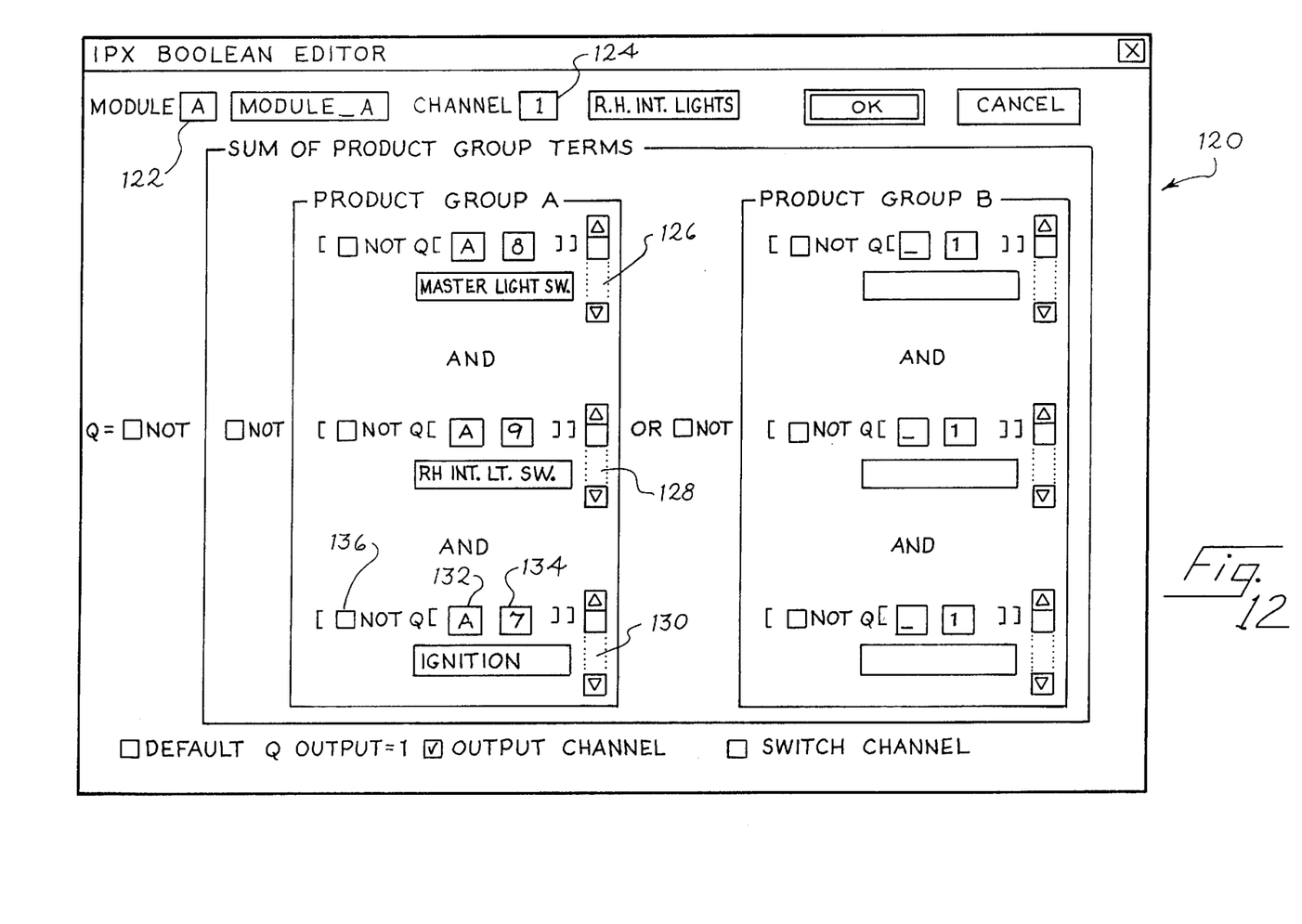
FIG. 12 is an illustration of a screen displayed by the Boolean editor of FIG. 9.

The Boolean editor uses a graphical user interface. This graphical user interface allows the user readily to select or modify the Boolean relationship for any given multiplex channel. The user first defines the module and the channel to be programmed by using a channel selection screen (not shown) to call up a screen 120. In this example module A, channel 1 has been selected, as indicated in display regions 122, 124, and channel 1 has been given the functional name R. H. Int Lights, indicating the right hand interior lights of a vehicle.

The main body of the screen 120 defines the Boolean relationship that is used to control channel A1. In this example, Q=1 (i.e. the right hand interior lights are turned on) only if channel A8 (Master Light Switch) is on and channel A9 (Right Hand Interior Light Switch) is on, and channel A7 (Ignition) is on. Note that each of the channels in Product Group A can be freely selected by the user by scrolling through a list of available channels using the scroll bars 126, 128, 130. Alternatively, the corresponding letter and number may be typed into the text entry regions 132, 134, respectively. The user does not have to remember the function of individual channels, since the functions are indicated by the functional names. Furthermore, the user does not have to remember the existence of individual channels, because the user can simply scroll through the available channels to find the channel of interest. Thus, the software that generates the screen of FIG. 12 includes a Boolean relationship selection or modification system, a channel list display system and a channel selection system. The Boolean editor allows any of the 160 multiplex channels to be programmed as an input channel or as an output channel, as appropriate for the particular application and the particular I/O units of the application. Since specific channels are not pre-assigned as inputs or outputs, the multiplex system 10 provides great flexibility.

As shown in FIG. 12, logical OR and NOR operations can be performed using Product Groups A and B. Appropriate channels are entered as described above in Product Groups A and B, which are combined with a logical OR. The features of the screen 120 described above allow a full set of Boolean operations (including AND, NAND, OR, NOR, XOR and Flip Flop operations) to be entered.

An additional feature is that each of the channels is associated with a check box 136 labeled "NOT Q". By checking this box, the user can designate the Boolean NOT operation. In this way, Boolean AND functions can be used to obtain any desired logical combination. The software that generates the check boxes labeled "NOT Q" makes up a NOT selection system.

The user can define the Boolean relationships used by the control unit 12 simply by progressing through the individual channels of the multiplex system and using the screen of FIG. 12 to enter the desired channels and the desired Boolean relationships.

It should be apparent that the programming system 44 can readily be used by someone with no detailed programming experience. This facilitates initial setup and modification of the control unit 12 and allows a relatively untrained person to set up the control unit 12.

The functions described above can readily be programmed by one of ordinary skill in the art. The preferred embodiment of this invention is intended to run in a Windows 95 environment, though any other programming language or environment can be used. The widest range of programming techniques, programming logic, and computers can be used to implement the functions described above, and it is not intended to limit this invention to any particular implementation.

In order to define the best mode of the invention contemplated by the inventor, this specification includes Appendix A, which includes a program listing for the programming system 44 and instructions for assembling this program listing; Appendix B, which includes a program listing for the CPU program memory 54 and instructions for assembling this program listing; and Appendix C, which includes schematic diagrams for the control unit 12 and the I/O unit 18, and a detailed timing diagram. It is submitted that the hardware schematics of Appendix C are not needed to enable one of ordinary skill in the art to make and use this invention. Rather, they are provided to ensure that the program listings of Appendices A and B can easily be used.

As used herein, in the time "reprogrammable memory" is intended broadly to encompass any read/write memory, including RAM, flash memory, EPROMs, and the like. The time "memory" is intended broadly to encompass one or more devices. A portion of memory may be made up of multiple noncontiguous memory locations.

The term "Boolean relationship" is intended broadly to define the logical relationship between inputs and outputs, and Boolean relationships can be implemented in any desired language.

Of course, it should be understood that a wide range of changes and modifications can be made to the preferred embodiment described above. The number of clock pulses within a set of clock pulses, the number of first synchronization signals within a set of first synchronization signals, and the specific hardware implementation can all be adjusted as appropriate for the particular application. Furthermore, the various improvements included in the system 10 can be used separately from one another rather than together. For example, the programming system can be used with a multiplexing system that uses other types of timing signals than those described above, and vice-versa. The digital logic unit of the control unit may take the form of integrated circuits instead of a micro-processor. As another alternative, the digital logic unit of the I/O units may take the form of a microcontroller or microprocessor. In this case, various elements such as the channel counter and the module select logic may be implemented in software.

Since the foregoing detailed description has described only a few of the many forms this invention can take, it is intended that the invention itself be defined only by the following claims, including all equivalents, and not by the foregoing detailed description.

We claim:

1. A time-division multiplexing system control unit adapted for use with a plurality of I/O units, said I/O units each associated with at least one respective multiplex channel, said control unit comprising:
   a logic unit operative to generate timing signals for the I/O devices, said timing signals comprising:
      a plurality of clock signals grouped in sets, each set of clock signals associated with a separate respective one of the I/O units;
      a plurality of first synchronization signals grouped in sets, each first synchronization signal interposed between two adjacent sets of clock signals such that the first synchronization signals mark boundaries of the sets of clock signals;
      a plurality of second synchronization signals, each second synchronization signal interposed between two adjacent sets of the first synchronization signals such that the second synchronization signals mark boundaries of the sets of first synchronization signals.

2. The invention of claim 1 wherein the first synchronization signals and the clock signals are characterized by respective pulse durations, and wherein the pulse duration of each first synchronization signal is greater than the pulse duration of each clock signal.

3. The invention of claim 1 wherein each first synchronization signal comprises a single pulse, and wherein the second synchronization signal comprises a double pulse.

4. The invention of claim 1 wherein each first synchronization signal is associated with a separate respective one of the I/O units, and wherein each second synchronization signal is associated with a first one of the I/O units.

5. A time-division multiplexing system I/O unit comprising:
   a clock signal receiver responsive to clock signals generated by a control unit to generate received clock signals;
   a first synchronization signal receiver responsive to first synchronization signals generated by the control unit to generate received first synchronization signals;
   a second synchronization signal receiver responsive to second synchronization signals generated by the control unit to generate received second synchronization signals;
   a channel counter responsive to the received clock signals to step through a plurality of I/O channels;
   a module select logic responsive to the received first synchronization signals to increment a count;
   an address register operative to store an address;
   said module select logic reset by the received second synchronization signals and operative to enable the I/O unit only when the address corresponds to the count of the module select logic.

6. The invention of claim 5 wherein the channel counter is responsive to the received first synchronization signals to reset the channel counter.

7. The invention of claim 1 in combination with a programming system for the time-division multiplexing system control unit, said control unit further comprising a re-programmable memory operative to store Boolean relationships among selected multiplex channels, said programming system comprising:

a graphical user interface comprising first means for displaying a first one of the Boolean relationships graphically, said first means comprising means for displaying first functional names of at least selected ones of the multiplex channels included in the first Boolean relationship; and means for selecting the first Boolean relationship and the first functional names in response to user input; and means for storing the selected first Boolean relationship in the memory.

8. The invention of claim 7 wherein the selecting means comprises:

means for presenting a user with a list of functional names of a plurality of the multiplex channels; and means for accepting user designation of a selected functional name included in the list.

9. The invention of claim 8 wherein the selecting means further comprises:

means for accepting user designation of a displayed region indicative of a Boolean NOT operation.

10. The invention of claim 7 wherein the Boolean relationships are selected from the group consisting of: AND, NAND, OR, NOR, XOR and combinations thereof.

11. The invention of claim 1 wherein the control unit further comprises:

a re-programmable memory; and a digital logic unit coupled to the memory;

said memory comprising a first portion storing functional names of at least some of the multiplex channels, and a second portion storing Boolean relationships among selected ones of the multiplex channels, each of said functional names verbally describing a respective function of the respective multiplex channel, said digital logic unit operative to generate control signals for the output devices as a function of the stored Boolean relationships.

12. The invention of claim 11 further comprising:

a programming system coupled to the control unit, said programming system comprising:

means for reading the first functional names and the first Boolean relationships from the memory; and means for displaying the first functional names and the first Boolean relationships to a user.

13. The invention of claim 12 wherein the programming system further comprises:

means for modifying the first functional names in response to user input;

means for modifying the first Boolean relationships in response to user input; and means for storing the modified functional names and the modified Boolean relationships in the memory.

* * * * *